UNITED STATES PATENT OFFICE.

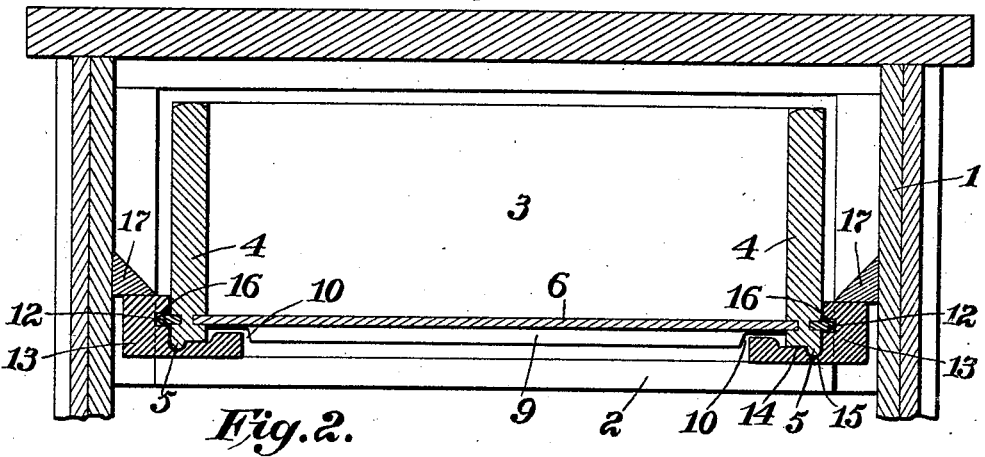

GEORGE L. PROBST, OF WASHINGTON, DISTRICT OF COLUMBIA.

CABINET-DRAWER AND SUPPORTING-GUIDE THEREFOR.

1,318,919. Specification of Letters Patent. Patented Oct. 14, 1919.

Application filed June 5, 1919. Serial No. 301,988.

*To all whom it may concern:*

Be it known that I, GEORGE L. PROBST, a citizen of the United States, residing at Washington, District of Columbia, have invented certain new and useful Improvements in Cabinet-Drawers and Supporting-Guides Therefor, of which the following is a specification.

This invention relates to a cabient drawer and supporting guides therefor, and it consists in the novel features hereinafter described and claimed.

An object of the invention is to provide a combined drawer and supporting guides of simple and durable structure, and so made and associated, that the guides may be quickly, properly and accurately positioned and secured in a cabinet or similar inclosure.

A further object of the invention is to provide means for accurately directing the sliding movement of the drawer upon the supporting guides and means for restraining the drawer against tilting when it is at an open position with relation to the supporting guides and cabinet.

A still further object of the invention is to provide in a combination, as stated, means for restraining the drawer against lateral movement with relation to the supporting guides and cabinet, and a further object of the invention is to provide in such a combination means whereby the guides may serve as stops for limiting the inward movement of the drawer with relation to the cabinet.

Other objects and advantages will be made manifest as the description of the device progresses.

In the accompanying drawing:

Figure 1, is a transverse sectional view of the drawer, the supporting guides and a portion of the cabinet.

Fig. 2, is a fragmentary sectional view of portions of the cabinet and drawer, taken at the forward end of the drawer, and in a plane at a right angle to the view illustrated in Fig. 1.

Fig. 3, is a fragmentary horizontal sectional view of the cabinet showing the drawer in plan.

Fig. 4, is a fragmentary perspective view of one of the guides.

Fig. 5, is a fragmentary perspective view of a corner portion of the drawer, bottom side up.

As illustrated in the accompanying drawing the cabinet 1, may be of any usual design or pattern and may be in the form of a stand, bureau-body, case or other article of furniture. The front side of the cabinet, except when closed by the drawer or drawers, is open, and cross-rails 2, are fixed in the cabinet at the front and rear sides and just below the drawer compartment.

The drawer 3, is provided with side pieces 4, having at their lower edges beads 5, which extend the full length of the side pieces, and which are located adjacent the outer surfaces of the said side pieces. The bottom piece 6, is supported in the side pieces 4, as shown in Fig. 1, of the drawing, and slightly above the lower edges of the pieces 4. The front piece 7, of the drawer projects slightly below the bottom piece 6, as at 8, and as best shown in Fig. 2, of the drawing. The back piece 9, of the drawer is cut away or recessed, as at 10, at its lower edges and adjacent the side pieces 4, as best shown in Fig. 5, of the drawing. Also as shown in Fig. 5, of the drawing, the bead 5, may terminate short of the inner end of the side piece 4, leaving a space, as at 11. The side pieces 4, are provided at their lower portions and in the vicinity of their inner ends with outwardly disposed flanges 12.

As the supporting guides, two in number, are alike, the description of one will answer for both. Each guide consists of a strip 13, of wood. The strip 13, is substantially rectangular in transverse section and is provided at the upper face of its lower portion with a longitudinally disposed channel 14, adapted to receive the lower portion of one of the side pieces 4, of the drawer. The lower edge of the side pieces 4, rests directly upon the bottom of the channel 14, whereby the lower portion of the guide strip 13, sustains the weight of the drawer and its contents. The guide strip 13, is further provided with a longitudinally disposed groove 15, which snugly receives the bead 5, of the side pieces 4, as best shown in Fig. 1, and this groove and bead restrains the drawer against lateral movement, when stationary, or during its sliding movement.

The lower surface of the bottom piece 6, is spaced above the upper surface of the inner portion of the guide strip 13, as shown in Fig. 1, and the recesses 10, permit the back piece 9, of the drawer to pass freely over the inner portions of the guide strips 13.

The groove 15, is adjacent the outer portion of the channel 14, and is practically formed in the bottom of the said channel. Each guide strip 13, is further provided with a longitudinally disposed groove 16, located above the groove 15, and above the upper edge of the channel 14, and at the inner surface of the outer portion of the guide strip 13. The groove 16, receives the flange 12, upon one of the side pieces 4, of the drawer.

When the drawer is in a closed position in the cabinet 1, as shown in Fig. 2, of the drawing, the inner surface of the lower portion of the front piece 7, of the drawer, at the point 8, comes in contact with the forward ends of the guide strips 13, and consequently said front piece and the guide strips serve as means for limiting the inner movement of the drawer with relation to the cabinet. Furthermore, this assures that the front piece 7, of the drawer, will properly close the opening at the front of the cabinet and above the front cross-rail 2, when the drawer is in a closed position in the cabinet.

As hereinbefore stated, the bead 5, and groove 15, restrain the drawer 3, against lateral movement in relation to the cabinet. The lower edges of the side pieces of the drawer rest directly upon the bottom of the channels 14, and provide bearing means between the drawer and the guide strips. The flanges 5, which are received within the grooves 16, serve to prevent the drawer from tilting with relation to the cabinet when the drawer is at an open position.

When the parts are being assembled in the cabinet the strips 13 are applied to the lower edges of the side pieces 4, of the drawer, and glue or other adhesive is applied to the under surface of the strip 13, at the forward and rear ends thereof. The strips and drawer are then inserted in the drawer opening of the cabinet whereby the end portions of the strips which are supplied with the adhesive are permitted to rest upon the cross-rails 2. Thus the strips 13, are secured in their proper positions while the drawer is *in situ* in its compartment, consequently, the strips are accurately and properly positioned so that the drawer will have its intended and proper support and movement as hereinbefore described. After the glue has hardened and the strips 13, are fixed, they are braced in their positions by means of cleats 17, which are secured by glue to the inner surfaces of the sides of the cabinet 1, and the outer surfaces of the strips 13, as best shown in Figs. 1 and 3, of the drawing.

From the foregoing description, taken in conjunction with the accompanying drawing, it will be seen that a combined drawer and guide and supporting strips of simple and durable structure is provided, and that the strips may be accurately and quickly secured in place in the cabinet, and when in proper position will effectually support the drawer and control the sliding movement thereof.

Furthermore by employing the beads 5 to fit within the grooves 15 the initial positioning of the drawer will correctly aline the strips 13 with relation to the drawer so that it will always run smoothly and not bind. This is considered a feature of the invention for if the strips were first fastened or placed in position with relation to the opening or with relation to the sides of the cabinet rather than by the initial positioning upon the drawer the same would not have the free running qualities it should possess. In other words the tracks and drawer are bound to be properly positioned with relation to each other as the beads fitting within the grooves will properly position the strips and they will " set " in this position and then may be further held by the cleats 17.

Having described the invention, what is claimed, is:

1. A drawer having side pieces provided at their lower edges with longitudinally disposed guide beads, guide strips having channels which receive the lower portions of said side pieces to support the drawer, and said guide strips also provided with grooves to receive the said beads for initially positioning said guide strips with relation to said drawer.

2. A drawer having side pieces provided at their lower edges with longitudinally disposed beads, guide strips formed to receive the lower portions of said side pieces to support the drawer, said guide strips provided with grooves to receive the said beads for initially positioning the said guide strips with relation to the drawer, and means on the sides of said side pieces coöperating with said guide strips for preventing tipping of the drawer.

3. A drawer having side pieces provided at their lower edges with longitudinally disposed guide beads, guide strips provided to receive the lower portion of said side pieces to support the drawer, said guide strips provided with grooves to receive said guide beads for initially positioning the guide strips with relation to the drawer, said guide strips also provided with longitudinally disposed grooves in their upright portion, a relatively short fin on each of the side pieces of the drawer fitting within said last mentioned grooves to thereby prevent the drawer from tilting when operated.

4. A guide for a cabinet drawer comprising an angular strip, a bearing surface in the form of a longitudinally disposed groove in the base of the strip, a guide channel adjacent to said groove and extending below the surface of said bearing surface, and the leg of said guide strip also provided with a longitudinally disposed groove and in a plane above that of the bearing surface formed in the base.

In testimony whereof I affix my signature.

GEORGE L. PROBST.

Copies of this patent may be obtained for five cents each, by addressing the "Commissioner of Patents, Washington, D. C."